Aug. 7, 1945.  E. S. COOK  2,381,208
BRAKE AND POWER INTERLOCK APPARATUS
Filed Sept. 30, 1942
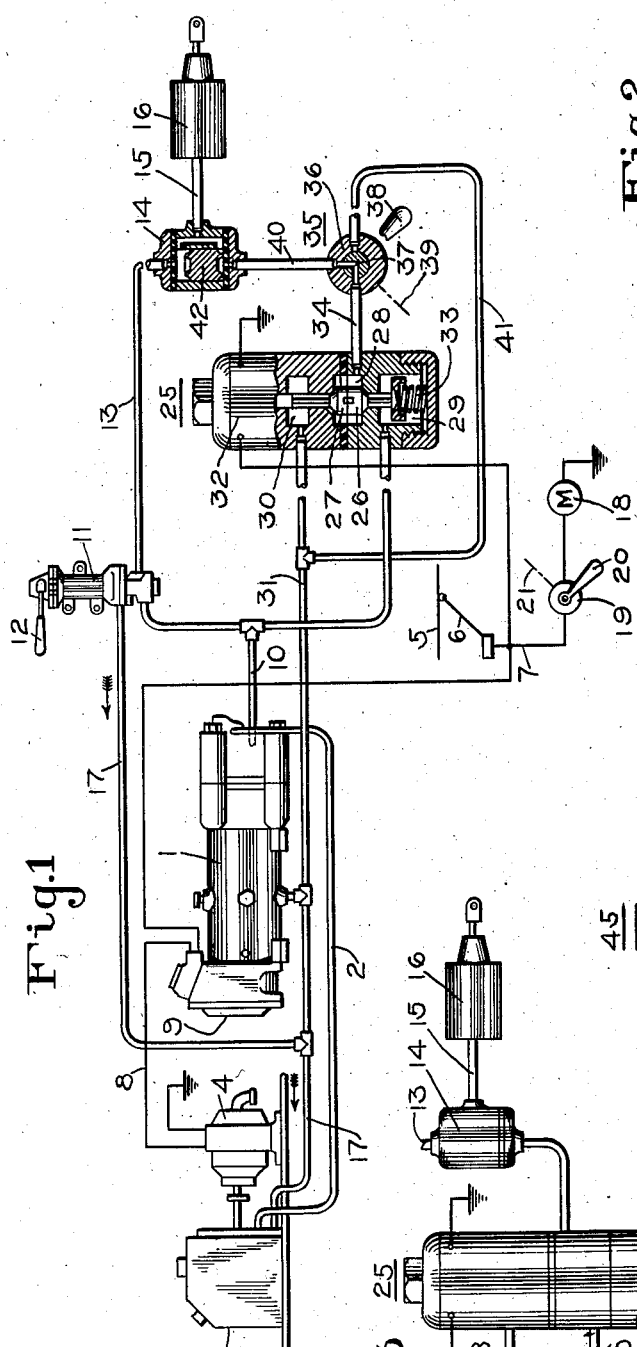
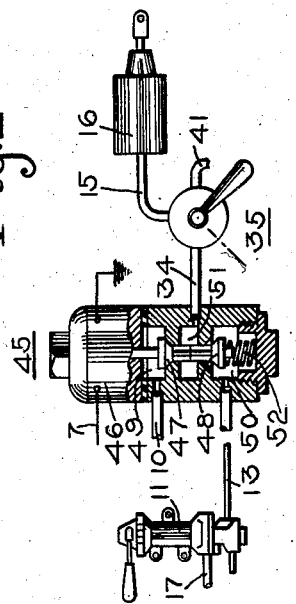
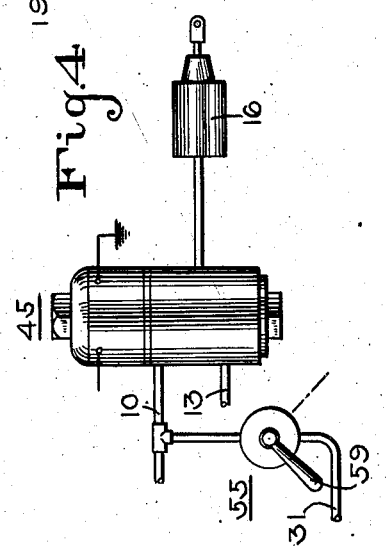
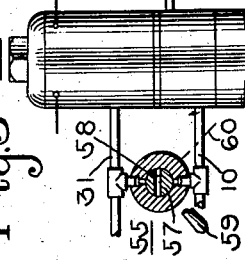
INVENTOR
Earle S. Cook
BY
ATTORNEY Patented Aug. 7, 1945

2,381,208

UNITED STATES PATENT OFFICE 2,381,208

BRAKE AND POWER INTERLOCK APPARATUS

Earle S. Cook, Wilkinsburg, Pa., assignor to The Westinghouse Air Brake Company, Wilmerding, Pa., a corporation of Pennsylvania Application September 30, 1942, Serial No. 460,268

21 Claims. (Cl. 303—1)

This invention relates to brake and power interlock apparatus and more particularly to means for causing the brakes on a vehicle to be applied automatically in case of failure of the propelling power for the vehicle.

On certain electrically operated locomotives, the controller which controls the supply of electric current to the motor for propelling the locomotive has different positions for causing operation of the motor in either one direction or the reverse to move the locomotive either forwardly or backwardly, and at times with the locomotive running in one direction the controller is moved to the position for causing reverse operation of the motor or for so-called "bucking" the motor in order to brake the locomotive. If at the time the controller were operated to thus brake the locomotive there would be no electric power, due for instance to the trolley wheel having jumped off of the trolley wire, then obviously the locomotive would not be braked and an accident might result.

One object of the invention is therefore the provision of an arrangement which is operative automatically upon failure of the supply of electric current to the locomotive motor to effect an application of brakes on the locomotive to stop same.

Another object of the invention is the provision of such an arrangement which also embodies means for effecting a release of the automatic application of brakes with the electric power to the locomotive cut off in case for instance it is desired to move the locomotive for repairs before the electric power is restored.

Other objects and advantages will be apparent from the following more detailed description of the invention.

In the accompanying drawing; Fig. 1 is a diagrammatic view, with the parts shown mainly in elevation, of a brake and power control system for a locomotive; Fig. 2 is a diagrammatic view of a portion of the apparatus shown in Fig. 1 and embodying a modification of the invention; Fig. 3 is a diagrammatic view of a portion of the apparatus shown in Fig. 1 and embodying another modification thereof; and Fig. 4 is a view similar to Fig. 2 but embodying the modification illustrated in Fig. 3.

Description Fig. 1

The brake system employed for illustrating the invention may be identical to the hydraulic brake system disclosed in the pending application of Rankin J. Bush, Serial No. 440,823 filed April 28, 1942, and therefore comprises an accumulator 1 arranged to be charged by way of a pipe 2 with liquid under pressure delivered by a hydraulic pump not shown but contained in a liquid reservoir or sump 3. An electric motor 4 is provided for operating the hydraulic pump and current for operating said motor may be obtained from any suitable source such as a trolley wire 5, a trolley 6 and wires 7 and 8, the connections between the wires 7 and 8 being controlled by an electric switch 9 associated with the accumulator 1. This switch is operative by the accumulator when the amount of liquid under pressure therein is reduced to a certain minimum degree, to close the circuit through wires 7 and 8 and thereby to the motor 4 to cause operation thereof and of the pump operated thereby to displace liquid under pressure into the accumulator 1. When the amount of liquid in the accumulator is thus increased to a maximum desired degree, the switch 9 operates automatically to open the circuit through motor 4 to stop same and thereby the pump. In this manner the motor 4 and pump will be caused to automatically operate and then be stopped, as required, to maintain a desired reserve of liquid under pressure in the accumulator at all times, as described in detail in the above referred to Bush application in view of which a more detailed description is not deemed essential herein to a clear understanding of the invention.

Liquid under pressure from the accumulator is constantly supplied through a supply pipe 10 to a brake valve device 11 which may be identical to that fully disclosed and described in Patent 2,324,910 issued on July 20, 1943, to Earle S. Cook. In view of this the brake valve will be described herein only briefly.

The brake valve device 11 comprises an operating handle 12 which is operable by the operator to open a communication between the liquid supply pipe 10 and a pipe 13 for supplying liquid under pressure from the accumulator 1 to said pipe and thence through a double check valve device 14, which will be later described, and a pipe 15 to a brake cylinder device 16 for effecting operation of said brake cylinder device to apply the brakes on the locomotive. The handle 12 is also operable by the operator to a brake release position to close communication between pipes 10 and 13 for cutting off the supply of liquid under pressure to the brake cylinder device 16 and to open pipe 13 to a sump pipe 17 leading to the liquid reservoir or sump 3 to thereby relieve the pressure of liquid in the brake cylinder device 16 for releasing the brakes on the locomotive.

The power system for the locomotive may, by way of illustration, comprise a propulsion motor 18 and a manually operable power controller 19 arranged to control the supply of electric power from the trolley 5 to said motor for causing same to operate to propel the locomotive. The controller 19 may comprise a control lever 20 having a position such as shown for causing the motor 18 to operate to drive the locomotive in one direction, and another position such as indicated by a dot and dash line 21 for causing the motor 18 to operate to drive the locomotive in the opposite direction. With the lever 20 in either of its positions and the locomotive running in a corresponding direction, the locomotive may be braked if said lever is moved to its other position due to the resulting action of the motor 18 to oppose continued movement of the locomotive, as is well known. If at the time the controller 19 is operated to cause the motor 18 to brake the locomotive there should be no electric current available from trolley wire 5 for supply to the motor 18, due, for example, to trolley 6 having jumped off of the trolley wire 5, then obviously the motor 18 will fail to operate to brake the locomotive and damaging or wrecking of the locomotive and possibly of a train may result. This is liable to occur even though the locomotive is provided with a fluid pressure brake system such as above described, particularly where it has become a custom or habit to employ the motor 18 for braking purposes.

According to the invention I provide means to operate automatically in case of failure of the supply of electric current to the locomotive to apply the brakes on the locomotive by operation of the brake cylinder device 16 so as to prevent damaging or wrecking of the locomotive under such a condition. As shown in Fig. 1 this means comprises a magnetically operated valve device 25 and the double check valve device 14.

The magnet valve device 25 comprises a pair of oppositely seating poppet valves 26 and 27 which are contained in a chamber 28. The valve 26 is arranged to control communication between chamber 28 and a chamber 29 to which is connected a branch of the liquid pressure supply pipe 10 so that said chamber is constantly supplied with fluid under pressure. The valve 27 is provided to control communication between chamber 28 and a chamber 30 which is open to a pipe 31 leading to the sump pipe 17 whereby chamber 30 is constantly open to the sump.

The magnet valve device 25 further comprises a solenoid 32 which is connected to wire 7 and therefore arranged to be energized when electric current is supplied from the trolley wire 5 to the motor controller 19. A failure of the supply of electric current to the controller 19 through wire 7 will result in deenergization of solenoid 32. Energization of solenoid 32 is adapted to unseat valve 27 and seat valve 26, while a spring 33 in chamber 29 is provided to open valve 26 and close valve 27 upon deenergization of solenoid 32. It will thus be seen that when the locomotive is in use and electric current is being supplied to the motor controller 19 the solenoid 32 will be energized to unseat valve 27 and open chamber 28 to the sump pipe 31, while in case the supply of electric current should fail the solenoid will be deenergized to allow spring 33 to open valve 26 and hence permit liquid under pressure to flow into chamber 28.

Chamber 28 is connected by a pipe 34 to a cock 35 which comprises a casing containing a plug valve 36 provided with a water way 37. A handle 38 is provided for turning the plug valve 36 from its normal position shown to a brake release position in which said handle will occupy a position such as indicated by a dash and dot line 39. In the normal position of the plug valve the water way 37 establishes communication between pipe 34 and a pipe 40 leading to the double check valve device 14, while in the brake release position said communication is closed and the water way 37 opens pipe 40 to a pipe 41 leading to pipe 31 which is open through pipe 17 to the sump 3.

The double check valve device 14 comprises a casing having two end outlets one connected to pipe 13 and the other to pipe 40 and also having a side outlet open to pipe 15. A double check valve 42 slidably mounted in the casing is arranged to control communication between the outlets open to pipes 13 and 40 and the outlet open to pipe 15.

In operation, the plug valve 36 of cock 35 is normally positioned as shown in the drawing so as to open pipe 40 to pipe 34, and with the solenoid 32 of the magnet valve 25 energized by current supplied from the trolley wire 5 to the controller 19 for propelling the locomotive, the magnet valve 27 is open so that pipe 34 is open to the sump 3. Thus the lower face of the double check valve 42 is open to the sump 3 so that said valve may shift to the position shown in the drawing under pressure of fluid supplied to pipe 13 by operation of the brake valve device 11 to thereby disconnect the brake cylinder pipe 15 from pipe 40 and open the brake cylinder pipe to pipe 13, whereby the operation of the brake cylinder 16 to control the brakes on the locomotive may be controlled by the brake valve device 11.

If the supply of electric current from trolley wire 5 to the motor controller 19 should for any reason fail, the solenoid 32 of the magnet valve device 25 will become deenergized and permit spring 33 to open valve 26 and close valve 27 to thereby permit liquid under pressure to flow from the acculator 1 to pipe 34 and thence through cock 35 and pipe 40 to the lower face of the double check valve 42. With the brake valve device 11 in its brake release position and the opposite face of the double check valve thus open to the sump pipe 17, the accumulator pressure supplied through pipe 34 and acting on the double check valve will shift same to its upper position to close communication between pipes 15 and 13 and to open pipe 15 to pipe 40. Liquid supplied from the accumulator to pipe 40 will then flow to pipe 15 and thence to the brake cylinder device to actuate same to apply the locomotive brakes.

It will now be seen that when it has become customary to employ the locomotive motor 18 for braking purposes a failure of the supply of electric current to the controller 19 to provide such braking can not result in a failure to obtain braking and hence wrecking or damaging of the locomotive, since such failure of current will automatically result in deenergization of solenoid 32 to cause an application of brakes by liquid under pressure from the accumulator 1.

When electric current is subsequently provided to the controller 19 upon possible correction of the cause of failure above mentioned, the solenoid 32 of the magnet valve device 25 will be energized and open the lower face of the double check valve 42 to the sump pipe 17. A release of liquid pressure from the brake cylinder device 16 to sump 3 will then take place to release the locomotive brakes. The locomotive may then be operated in the normal manner above mentioned.

If, however, it is desired or necessary to move the locomotive before the cause for failure of electric current to the controller 19 and thus solenoid 32 has been determined and proper repair effected, the handle 38 of cock 35 may be operated to turn the plug valve 36 to its brake release position in which the pressure of liquid in the brake cylinder device 16 will be dissipated through pipes 40, 41, 31 and 17 to the sump 3. The brakes on the locomotive will be thus released to permit movement of the locomotive.

When or before the locomotive is again placed in service the handle 38 and thereby the plug valve 36 of cock 35 must be returned to their normal positions shown to again connect the double check valve 14 to pipe 34, so that in case of subsequent failure of the supply of current to the controller the brakes on the locomotive will again be automatically applied in response to such failure in the same manner as above described.

Description Fig. 2

If desired, an electro-magnet device 45 connected into the hydraulic brake equipment as shown in Fig. 2 may be employed instead of the electro-magnetic device 25 and double check valve 14 to accomplish the same result.

The electro-magnet device 45 comprises a solenoid 46 connected to wire 7 to function identically to the solenoid 32 of the magnet device 25 shown in Fig. 1. The magnet device 45 further comprises two aligned poppet valves 47 and 48 contained in chambers 49 and 50 respectively and having fluted stems which engage each other in an intermediate chamber 51. The chamber 49 is connected to the liquid supply pipe 10 from the accumulator 1. The chamber 50 is connected to pipe 13 leading to the brake valve device 11, while chamber 51 is connected to pipe 13 leading to the cock 35. The brake cylinder pipe 15 is connected to the cock 35 at the location where pipe 40 was connected in the structure shown in Fig. 1.

In operation, with the cock 35 in its normal condition shown in Figs. 1 and 2, and with the solenoid 46 energized the valve 47 will be seated and the valve 48 open to connect the brake valve device 11 with the brake cylinder device 16 by way of pipe 13, past valve 48 to chamber 51 and thence through pipe 34, cock 35 and pipe 15. Under this normal condition of parts, the operation of the brake cylinder device 16 to control the brakes on the locomotive may be controlled by the brake valve device 11 in the same manner as before described, as will be readily seen.

If, however, the supply of current to the controller 19 should fail for any reason, the resultant deenergization of solenoid 46 will permit a spring 52 in valve chamber 50 to seat valve 48 and unseat valve 47 and thus connect the brake cylinder device 16 directly to the accumulator pressure pipe 10, whereupon the locomotive brakes will be automatically applied. If it is desired to effect a release of the brake application before restoration of the supply of electric current to the controller 19 this may be done by operation of cock 35 in the same manner as described in connection with the structure shown in Fig. 1.

Description Figs. 3 and 4

It will be noted in connection with the structures shown in Figs. 1 and 2 that when cock 35 is turned to its brake release position, the pipe 34 is disconnected from the brake cylinder device 16 so as to retain the liquid pressure in the accumulator 1 while dissipating that from the brake cylinder device and after the brakes are thus released they may be subsequently controlled by the brake valve device 11 without returning the cock 35 to its normal position shown. This is undesirable in that a locomotive might unintentionally or otherwise be placed back in service with the cock 35 in its brake release position which would prevent an application of brakes in case the electric power to controller 19 should fail. Proper manual positioning of the cock 35 will preclude such a possibility however, as will readily be seen.

Nevertheless, in order to ensure that such an undesirable condition can not obtain, the cock 35 in the structures shown in Figs. 1 and 2 may be dispensed with and a cock 55 added to said structures as shown in Figs. 3 and 4, respectively.

The cock 55 comprises a plug valve 57 having a waterway 58 and a handle 59 for turning the plug valve from a normal closed position as shown in Fig. 3 to a brake release position in which the handle will occupy a position such as indicated by a dot and dash line 60.

In both of the structures shown in Figs. 3 and 4 the cock 55 is arranged to control a communication between the sump pipe 31 and the liquid pressure supply pipe 10 leading to the magnet valve device 25 or 45. The cock 55 when in its normal position shown closes this communication so that the brakes on the locomotive may be controlled from the brake valve device 11 and also be applied in case the electro-magnet device 25 or 45 becomes deenergized due to failure of electric power, in the same manner as before described in connection with the structure, shown in Figs. 1 and 2.

An application of brakes effected upon deenergization of the electro-magnet device 25 or 45 may be released in these structures by turning cock 55 to its brake release position for connecting pipe 10 to the sump pipe 11 since the brake cylinder device 16 will at this time be open to the pipe 10. Since the accumulator 1 is always open to pipe 10 it will also be noted that liquid pressure in the accumulator will be dissipated to the sump upon dissipating that from the brake cylinder device to release the locomotive brakes. The brakes on the locomotive can not again be applied by the brake valve device 11 until after the pressure in the accumulator has been restored, and such restoration requires that the cock 55 be returned to its normal position for closing communication between the accumulator and sump and as an indirect result insures an automatic application of brakes in case of failure of the supply of electric current to the electromagnet device 25 or 45.

Summary

It will now be seen that I have provided means to cause automatically an application of brakes on a locomotive in case of failure of the propelling power to the locomotive, so as to insure that the locomotive will be brought to a stop under such a conduition of emergency. Means are also provided which permits the release of brakes on the locomotive in case it is desired to move the locomotive for repairs or for any other reason prior to restoration of power, and this release means may be either in a form to prevent what might be considered an undesirable loss of liquid under pressure from the accumulator, or in another form which insures that the automatic brake applying means will function as intended when the locomotive is again placed in service with other parts of the brake system in an operative condition.

Having now described my invention, what I claim as new and desire to secure by Letters Patent, is:

1. In a brake and power control apparatus for a vehicle, in combination, a source of fluid under pressure, brake cylinder means operable by fluid under pressure to apply the brakes on said vehicle and upon release of fluid under pressure to release the brakes on said vehicle, manually controlled means having a brake release position for releasing fluid under pressure from said brake cylinder means and being movable out of said release position to open communication between said source of fluid under pressure and brake cylinder means for supplying fluid under pressure to said brake cylinder means, a source of power for propelling said vehicle, and mechanism, including means controlled by said power, and operable upon failure of said power to effect closure of said communication and to establish another communication between said source of fluid under pressure and said brake cylinder means for supplying fluid under pressure to said brake cylinder means.

2. In a brake and power control apparatus for a vehicle, in combination, a source of fluid under pressure, brake cylinder means operable by fluid under pressure to apply the brakes on said vehicle and upon release of fluid under pressure to release the brakes on said vehicle, manually controlled means having a brake release position for releasing fluid under pressure from said brake cylinder means and being movable out of said release position to open communication between said source of fluid under pressure and brake cylinder means for supplying fluid under pressure to said brake cylinder means, a source of power for propelling said vehicle, and mechanism including means controlled by said power and operable upon failure of said power to effect closure of said communication and to establish another communication between said source of fluid under pressure and said brake cylinder means for supplying fluid under pressure to said brake cylinder means, said mechanism being operable by said power to close the last named communication and to provide for opening of the first named communication.

3. In a brake and power control apparatus for a vehicle, in combination, a source of fluid under pressure, brake cylinder means operable by fluid under pressure to apply the brakes on said vehicle and upon release of fluid under pressure to release the brakes on said vehicle, manually controlled means having a brake release position for releasing fluid under pressure from said brake cylinder means and being movable out of said release position to open communication between said source of fluid under pressure and brake cylinder means for supplying fluid under pressure to said brake cylinder means, a source of power for propelling said vehicle, and mechanism including means controlled by said power and operable upon failure of said power to effect closure of said communication and to establish another communication between said source of fluid under pressure and said brake cylinder means for supplying fluid under pressure to said brake cylinder means, said mechanism being operable by said power to close the last named communication and to open the first named communication.

4. In a brake and power control apparatus for a vehicle, in combination, brake cylinder means operable by fluid under pressure to apply the brakes on said vehicle and upon release of fluid under pressure to release said brakes, manually controlled means operable to supply fluid under pressure to a pipe for supply to said brake cylinder means and having a brake release position for releasing fluid under pressure from said pipe, a source of power for propelling said vehicle, means controlled by said power and conditionable thereby to release fluid under pressure from a second pipe and operable upon failure of said power to supply fluid under pressure to said second pipe for supply to said brake cylinder means, and a double check valve controlling communication between the two pipes and said brake cylinder means and operable by fluid under pressure supplied to either of said pipes to open communication between the pipe supplied with fluid under pressure and said brake cylinder means and to close communication between said brake cylinder means and the other pipe.

5. In a brake and power control apparatus for a vehicle, in combination, brake cylinder means operable by fluid under pressure to apply the brakes on said vehicle and upon release of fluid under pressure to release said brakes, manually controlled means operable to supply fluid under pressure to a pipe for supply to said brake cylinder means and having a brake release position for releasing fluid under pressure from said pipe, a source of power for propelling said vehicle, and means controlled by said power controlling communication between said pipe and brake cylinder means and conditionable by said power to open said communication and operable upon failure of said power to close said communication and to open another communication for supplying fluid under pressure to said brake cylinder means.

6. In a brake and power control apparatus for a vehicle, in combination, a source of power for propelling said vehicle, brake cylinder means operable by fluid under pressure to apply the brakes on said vehicle and upon the release of fluid under pressure to release the brakes on said vehicle, manually controlled means operable to supply fluid under pressure to and release fluid under pressure from said brake cylinder means, and safety means controlled by said power and operable upon failure thereof to supply fluid under pressure to said brake cylinder means and to render said brake cylinder means non-controllable by said manually controlled means and operable by said power to provide for control of said brake cylinder means by said manually controlled means.

7. In a brake and power control apparatus for a vehicle, in combination, a source of power for propelling said vehicle, brake cylinder means operable by fluid under pressure to apply the brakes on said vehicle and upon the release of fluid under pressure to release the brakes on said vehicle, manually controlled means operable to supply fluid under pressure to and release fluid under pressure from said brake cylinder means, safety means controlled by said power and operable upon failure thereof to supply fluid under pressure to said brake cylinder means and to render said brake cylinder means non-controllable by said manually controlled means and operable by said power to provide for control of said brake cylinder means by said manually controlled means, and manually controlled means arranged to release fluid under pressure from said brake cylinder means with said safety means in the condition providing for supply of fluid under pressure to said brake cylinder means.

8. In a brake and power control apparatus for a vehicle, in combination, a source of power for propelling said vehicle, brake cylinder means operable by fluid under pressure to apply the brakes on said vehicle and upon the release of fluid under pressure to release the brakes on said vehicle, manually controlled means operable to supply fluid under pressure to and release fluid under pressure from said brake cylinder means, safety means controlled by said power and operable upon failure thereof to supply fluid under pressure to said brake cylinder means and to render said brake cylinder means non-controllable by said manually controlled means and operable by said power to provide for control of said brake cylinder means by said manually controlled means, and manually controlled means arranged to close communication between said safety means and brake cylinder means and to release fluid under pressure from said brake cylinder means.

9. A brake system for an electrically propelled vehicle comprising in combination with a source of electric power for propelling the vehicle, brake cylinder means operable by fluid under pressure to apply the brakes on said vehicle and upon release of fluid under pressure to release the brakes on said vehicle, and a brake valve device operable to supply fluid under pressure to said brake cylinder means and movable to a position for releasing fluid under pressure from said brake cylinder means, of an electro-magnet energizable upon supply of electric power to said vehicle and deenergizable upon failure of said power, and valve mechanism conditionable in accordance with the condition of said electro-magnet and operable upon deenergization thereof to supply fluid under pressure to said brake cylinder means and close communication between said brake cylinder means and brake valve device and operable upon energization of said electro-magnet to cut off supply of fluid from said valve mechanism to said brake cylinder means and to provide for control of pressure in said brake cylinder means by said brake valve device.

10. A brake system for an electrically propelled vehicle comprising in combination with a source of electric power for propelling the vehicle, brake cylinder means operable by fluid under pressure to apply the brakes on said vehicle and upon release of fluid under pressure to release the brakes on said vehicle, and a brake valve device operable to supply fluid under pressure to said brake cylinder means and movable to a position for releasing fluid under pressure from said brake cylinder means, of an electro-magnet energizable upon supply of electric power to said vehicle and deenergizable upon failure of said power, valve mechanism conditionable in accordance with the condition of said electro-magnet and operable upon deenergization thereof to supply fluid under pressure to said brake cylinder means and close communication between said brake cylinder means and brake valve device and operable upon energization of said electro-magnet to cut off supply of fluid from said valve mechanism to said brake cylinder means and to provide for control of pressure in said brake cylinder means by said brake valve device, and valve means operable manually to release fluid under pressure from said brake cylinder means with said valve mechanism operable in response to deenergization of said electro-magnet.

11. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, and a manually controlled device operable to open said brake cylinder means either to said source of liquid pressure or to said sump, of an electro-magnet energizable upon supply of electric power from said source to said vehicle for propelling same and deenergizable upon failure of said supply of electric power, and valve mechanism conditionable in accordance with the condition of said electro-magnet and operable upon deenergization thereof to supply liquid under pressure from said source to said brake cylinder means and to effect closure of the communication between said brake cylinder means and manually controlled device, said valve mechanism being operable in response to energization of said electro-magnet to cut off the supply of liquid under pressure to said brake cylinder means by said valve mechanism and to provide for control of said brake cylinder means by said manually controlled device.

12. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, and a manually controlled device operable to open said brake cylinder means either to said source of liquid pressure or to said sump, of an electro-magnet energizable upon supply of electric power from said source to said vehicle for propelling same and deenergizable upon failure of said supply of electric power, valve mechanism conditionable in accordance with the condition of said electro-magnet and operable upon deenergization thereof to supply liquid under pressure from said source to said brake cylinder means and to effect closure of the communication between said brake cylinder means and manually controlled device, said valve mechanism being operable in response to energization of said electro-magnet to cut off the supply of liquid under pressure to said brake cylinder means by said valve mechanism and to provide for control of said brake cylinder means by said manually controlled device, and a manually operable valve controlling a communication between said brake cylinder means and sump and normally closing same and operable to open such communication for releasing liquid under pressure from said brake cylinder means to said sump.

13. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, and a manually controlled device operable to open said brake cylinder means either to said source of liquid pressure or to said sump, of an electromagnet energizable upon supply of electric power from said source to said vehicle for propelling same, and deenergizable upon failure of said supply of electric power, valve mechanism conditionable in accordance with the condition of said electro-magnet and operable upon deenergization thereof to supply liquid under pressure from said source to said brake cylinder means and to effect closure of the communication between said brake cylinder means and manually controlled device, said valve mechanism being operable in response to energization of said electro-magnet to cut off the supply of liquid under pressure to said brake cylinder means by said valve mechanism and to provide for control of said brake cylinder means by said manually controlled device, and a manually operable valve controlling the fluid supply communication between said mechanism and brake cylinder means and normally opening such communication and operable to close same and open said brake cylinder means to said sump.

14. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle and a manually controlled device operable to open said brake cylinder means either to said source of liquid pressure or to said sump, of an electromagnet energizable upon supply of electric power from said source to said vehicle for propelling same and deenergizable upon failure of said supply of electric power, valve mechanism conditionable in accordance with the condition of said electro-magnet and operable upon deenergization thereof to supply liquid under pressure from said source to said brake cylinder means and to effect closure of the communication between said brake cylinder means and manually controlled device, said valve mechanism being operable in response to energization of said electro-magnet to cut off the supply of liquid under pressure to said brake cylinder means by said valve mechanism and to provide for control of said brake cylinder means by said manually controlled device, and a manually operable valve controlling communication between said source of liquid pressure and said sump and normally closing such communication and operable to open same for releasing liquid under pressure from said source of liquid pressure and thereby from said brake cylinder means when open to such source by said mechanism conditioned in response to deenergization of said electro-magnet.

15. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, and a manually controlled brake valve device operable to open a pipe to either said source of liquid pressure or to said sump for thereby either supplying fluid under pressure to said pipe or releasing fluid under pressure therefrom for controlling said brake cylinder means, magnetically controlled means energizable upon supply of electric current from said power source to said vehicle for propelling same to open a second pipe to said sump and deenergizable upon failure of said electric current to open said second pipe to said source of liquid pressure for supplying liquid under pressure to said second pipe, and a double check valve connecting the two pipes to said brake cylinder means and operable by liquid under pressure supplied to either pipe to open same to said brake cylinder means and to close communication between said brake cylinder means and the other pipe.

16. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle and a manually controlled brake valve device operable to open a pipe to either said source of liquid pressure or to said sump for thereby either supplying fluid under pressure to said pipe or releasing fluid under pressure therefrom for controlling said brake cylinder means, magnetically controlled means energizable upon supply of electric current from said power source to said vehicle for propelling same to open a second pipe to said sump and deenergizable upon failure of said electric current to open said second pipe to said source of liquid pressure for supplying liquid under pressure to said second pipe, a double check valve connecting the two pipes to said brake cylinder means and operable by liquid under pressure supplied to either pipe to open same to said brake cylinder means and to close communication between said brake cylinder means and the other pipe, and a valve controlling communication between said sump and source of liquid pressure and normally closing same and operable manually to open same and thereby open said brake cylinder means to said sump with said magnetically controlled means deenergized.

17. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle and a manually controlled brake valve device operable to open a pipe to either said source of liquid pressure or to said sump for thereby either supplying fluid under pressure to said pipe or releasing fluid under pressure therefrom for controlling said brake cylinder means, magnetically controlled means energizable upon supply of electric current from said power source to said vehicle for propelling same to open a second pipe to said sump and deenergizable upon failure of said electric current to open said second pipe to said source of liquid pressure for supplying liquid under pressure to said second pipe, a double check valve connecting the two pipes to said brake cylinder means and operable by liquid under pressure supplied to either pipe to open same to said brake cylinder means and to close communication between said brake cylinder means and the other pipe and a manually operable valve controlling communication between said magnetically controlled means and said double check valve and normally opening such communication and operable to close same and open the connection with said double check valve to said sump for releasing liquid under pressure from said brake cylinder means.

18. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, a manually controlled brake valve device operable to open said brake cylinder means either to said source of liquid pressure or to said sump, of an electro-magnet energizable upon supply of electric power from said source for propelling the vehicle and deenergizable upon failure of said electric power, and valve means controlled by said electro-magnet controlling communication between said brake valve device and brake cylinder means and operable to open said communication upon energization of said electro-magnet and to close said communication upon deenergization of said electro-magnet, said valve means also controlling a communication between said source of liquid pressure and said brake cylinder means and being operable to close same upon energization and to open same upon deenergization.

19. A hydraulic brake system for an electrically propelled vehicle comprising in combination with a source of electric power for propelling said vehicle, a source of liquid under pressure, a liquid sump from which liquid is drawn and pumped into said source of pressure, brake cylinder means arranged to be operated upon connection with said source of liquid pressure to apply the brakes on the vehicle and upon connection with said sump to release the brakes on the vehicle, a manually controlled brake valve device operable to open said brake cylinder means either to said source of liquid pressure or to said sump, of an electro-magnet energizable upon supply of electric power from said source for propelling the vehicle and deenergizable upon failure of said electric power, valve means controlled by said electro-magnet controlling communication between said brake valve device and brake cylinder means and operable to open said communication upon energization of said electro-magnet and to close said communication upon deenergization of said electro-magnet, said valve means also controlling a communication between said source of liquid pressure and said brake cylinder means and being operable to close same upon energization and to open same upon deenergization, and a manual valve arranged to open communication between said brake cylinder means and sump for releasing the brakes.

20. A brake and power interlock arrangement for an electrically propelled vehicle having a hydraulic brake system comprising a source of liquid pressure, a liquid sump, brake cylinder means operable by liquid pressure from said source to brake the vehicle and upon connection with said sump to release said brake and an operator's brake valve device arranged to open said brake cylinder means either to said source or to said sump, said interlock arrangement comprising an electro-magnet energizable by electric power supplied to propel the vehicle and deenergizable upon failure of said electric power and valve means conditionable in accordance with the condition of said magnet and operable upon deenergization thereof to effect closure of the communication between said brake cylinder means and brake valve device and to open said brake cylinder means to said source of liquid pressure and operable upon energization to close the communication between said brake cylinder means and source and to provide for control of said brake cylinder means by said brake valve device.

21. A brake and power interlock arrangement for an electrically propelled vehicle having a hydraulic brake system comprising a source of liquid pressure, a liquid sump, brake cylinder means operable by liquid pressure from said source to brake the vehicle and upon connection with said sump to release said brake, and an operator's brake valve device arranged to open said brake cylinder means either to said source or to said sump, said interlock arrangement comprising an electro-magnet energizable by electric power supplied to propel the vehicle and deenergizable upon failure of said electric power, valve means conditionable in accordance with the condition of said magnet and operable upon deenergization thereof to effect closure of the communication between said brake cylinder means and brake valve device and to open said brake cylinder means to said source of liquid pressure and operable upon energization to close the communication between said brake cylinder means and source and to provide for control of said brake cylinder means by said brake valve device, and a manually adjustable cock controlling a communication between said brake cylinder means and sump and normally closing same and operable to open said communication for releasing liquid under pressure from said brake cylinder means to said sump with said valve means in the position for supplying liquid under pressure to said brake cylinder means.

EARLE S. COOK.